Oct. 4, 1966   W. R. GERMAN   3,276,250
TORQUE DETECTOR

Filed Dec. 12, 1963   2 Sheets-Sheet 1

INVENTOR.
WARREN R. GERMAN
BY
ATTORNEY

Oct. 4, 1966    W. R. GERMAN    3,276,250
TORQUE DETECTOR

Filed Dec. 12, 1963    2 Sheets-Sheet 2

INVENTOR.
WARREN R. GERMAN
BY
ATTORNEY

United States Patent Office 3,276,250
Patented Oct. 4, 1966

3,276,250
TORQUE DETECTOR
Warren R. German, Downey, Calif., assignor to
North American Aviation, Inc.
Filed Dec. 12, 1963, Ser. No. 330,042
9 Claims. (Cl. 73—136)

This invention relates to apparatus for measuring torque and more particularly to an improved and simplified means for measuring torque applied to a rotating drive shaft.

Devices which have previously been used to measure torque applied to a rotating shaft generally comprise two signal generating elements or transducer elements such as capacitor plates, or two sets of magnetic or optical indicia, which are respectively positioned on the shaft at two longitudinally spaced points between which twist will occur as torque is applied to the shaft. One or more cooperating transducer elements are so located that a pulse signal or signals will be generated therein as the shaft rotates and the cooperating transducer elements respectively move into and out of registry. When there is twist in the shaft the relative circumferential positions of the transducer elements on the shaft changes, and the output of the transducer also changes proportionally in either phase or amplitude or both, thus providing a measure of the applied torque.

Many of the available torque measuring systems of the type briefly outlined above are quite complicated in design and thus expensive. Some of the known systems provide accurate measurements of torque under favorable operating conditions but, because of inherent design limitations, are likely to give inaccurate readings when used under adverse conditions and not kept in proper adjustment by frequent time-consuming and inconvenient inspections. There has consequently been a need for an improved means for measuring torque applied to a rotating shaft by the method of detecting the degree of torsion in the shaft between two points longitudinally spaced thereon.

It is therefore a broad object of the invention to provide a simplified, reliable and inexpensive means for measuring the amount of torque applied to a rotating shaft. In a preferred embodiment of the invention which will be described in detail below, this object is accomplished by means of electrical signal generating and detecting equipment which is interconnected with two pairs of strip-shaped, coacting capacitor plates, one plate of each pair being helically mounted on the surface of a shaft subjected to the torque to be measured and the other plate being positioned adjacent to the shaft at a point where it registers with the shaft-mounted plate as the shaft rotates, each pair of capacitors thus generating pulse signals in the aforementioned electrical circuitry. The apparatus is so constructed and arranged that the electrical signals generated by interaction of each pair of capacitor plates are synchronized before torque is applied to the shaft. However, after torque is applied to the shaft the signals from the pairs of capacitors vary in time sequence according to the amount of twist in the shaft resulting from the applied torque. Because of unique arrangement of the invention, the applied torque can readily be measured by moving one of the capacitor plates in a direction parallel to the axis of the shaft so as to re-synchronize the signals generated in the pairs of capacitor plates, the distance that the movable plate must travel to re-synchronize the signals providing an accurate measurement of torque.

Another object of the invention is detection of displacement.

It is another object of the invention to provide a torque measuring device so constructed that it is relatively insusceptible to becoming maladjusted as result of vibration or other adverse conditions.

It is still another object of the invention to provide a torque measuring device the accuracy and sensitivity of which remain stable under a wide variety of operating conditions.

It is a further object of the invention to provide a troque measuring apparatus that is also capable of detecting imbalance of a rotating shaft.

It is an additional object of the invention to provide an apparatus which is capable of measuring the rotation speed of a shaft and also the torque which is applied to the shaft.

Various other objects and advantages will become manifest through reading the following description of one embodiment of the invention and examination of the accompanying drawings thereof, wherein.

Figure 1:
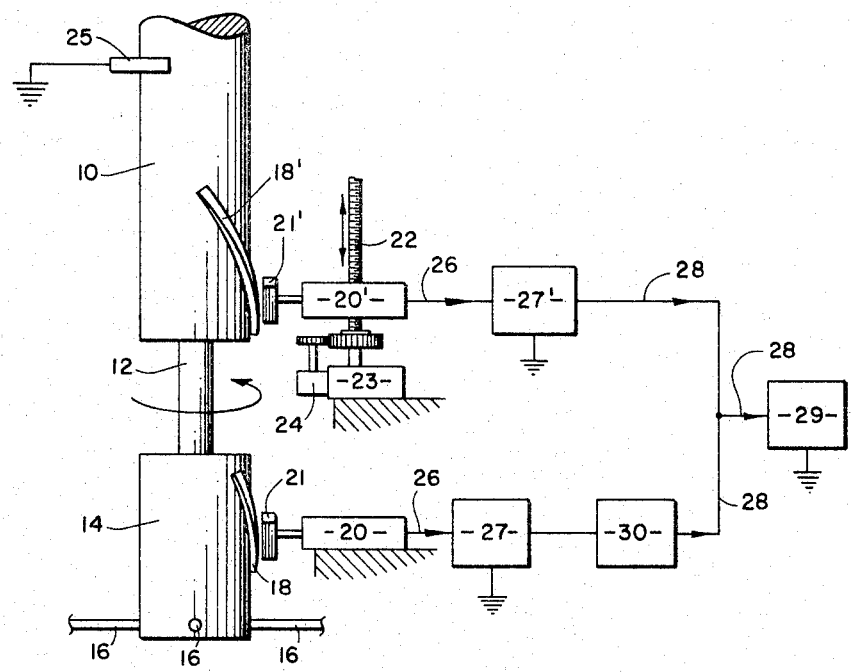
FIG. 1 is a diagrammatic representation of one embodiment of the invention and auxiliary electronic components for providing visual display of the electrical signals generated by the capacitor plates employed as detecting means in the embodiment.
Figure 9:
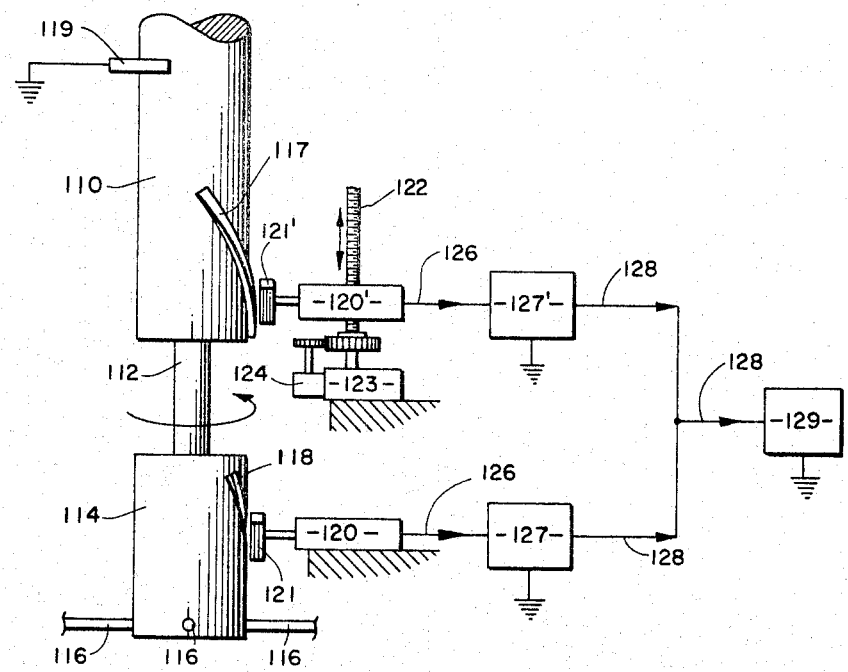
Figure 10:
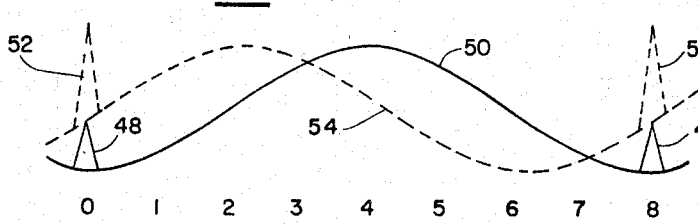

FIGS. 5, 6, 7, and 8 are representations of oscilloscope traces of the combined electrical signals from coacting capacitor plates of the embodiment of the invention illustrated in FIG. 1;

FIG. 9 is a diagrammatic representation of a second embodiment of the invention and auxiliary electronic equipment for providing visual display of the electrical signals generated by the capacitor plates employed as detecting means in the embodiment; and FIG. 10 represents oscilloscope traces of signals from coacting capacitor plates of the embodiment of the invention illustrated in FIG. 1 when that embodiment is employed as a means of detecting rotational imbalance of the spindle and hub shown therein.

Throughout the specification and drawings like reference characters refer to like parts.

FIG. 1 illustrates an embodiment of the invention that is used to measure torque applied to a rotatable drive shaft 10 which is integral with a spindle 12 of comparatively small diameter. The spindle 12 is in turn integral with a hub 14 which has a diameter the same as that of the shaft 10 and which itself supports a plurality of radially extending arms 16. The described arrangement of the shaft, spindle, hub and arms represents in simplified form the design of a type of test apparatus which is used in research relating to basic free molecule aerodynamic characteristics of elementary body shapes. In the use of this apparatus, material specimens in the form of disks or plates are mounted at the ends of the arms 16 and the shaft 10 is rotated by a suitable drive (not shown) at high speed in a highly evacuated chamber. For normal and tangential momentum exchange, a very sensitive, high r.p.m. torque measuring apparatus is required to determine the torque produced by the aerodynamic drag forces which act on the test specimens. The amount of torque applied to the shaft 10 can readily and accurately be measured by means of apparatus constructed in accordance with the principles of the invention, which, as illustrated in the figure, includes two metallic strips 18, 18' that are fixedly attached to, and project above, the respective surfaces of the shaft and hub 14. The strips have the same cross-sectional shape and both are mounted on their respective supporting surface so as to extend helically or obliquely thereabout at the same angle with respect to the common axis of the shaft, spindle and hub, the lower ends of the strips being circumferentially displaced from the upper ends in the direction of rotation of the assembly (indicated in the drawing by the arrow superimposed on the spindle 12). Strip 18', which for a reason that will appear hereinafter, is considerably longer than strip 18, is positioned on the shaft 10 so that its lower end portion is circumferentially aligned with strip 18, i.e., when spindle 12 is not twisted the leading edges of strips 18, 18' are vertically aligned as illustrated in FIG. 2.

Still in reference to FIG. 1, a capacitive type proximity transducer 20 is fixedly positioned (as, for example, on a shaft support) so that there is a small clearance between its reference plate 21 and strip 18 when the two are in juxtaposition. Strip 18 and plate 21 comprise the two relatively movable elements of this capacitive transducer. When interconnected by electrical circuitry which is described hereinafter, reference plate 21 and the surface of hub 14 (formed of an electrically conductive material) in effect form two plates of a capacitor, one of the plates (viz., the surface of hub 14) moving relative to the other. As the surface of hub 14 is normally equidistant from the reference plate 21 except at the point where strip 18 is attached to the hub, the capacitance between the hub and the reference plate will be substantially constant except when strip 18 is moved into registry with the reference plate, at which time the capacitance will momentarily increase to a maximal value (which, of course, occurs when the strip and reference plate are in alignment) after which it will decrease to the relatively constant value. In the described embodiment of the invention, transducer 20 comprises a "Model PT3-1" Proximity Transducer manufactured by the Photocon Research Products Company, Pasadena, California. A second transducer 20' of the same type as transducer 20 is mounted on a lead screw 22 so as to be vertically aligned with transducer 20, the reference plate 21' of this transducer being spaced from the surface of shaft 10 so that there is a small clearance between it and strip 18' when the two are in juxtaposition. Reference plate 21' and the surface of shaft 10 (also electrically conductive) also form two plates of a capacitor, with strip 18' changing the capacitance between these components when it moves into registry with the reference plate as the shaft rotates. A fixedly mounted drive means 23 is coupled to the lead screw 22 so as to permit the transducer 20' to be moved longitudinally along the surface of shaft 10 in a direction parallel to the shaft axis and oblique to the extent of strip 18' while reference plate 21' is maintained at the same distance from the outer surface of strip 18'. A revolution counter 24 is connected with the lead screw 22 and mounted on the drive means 23. As will become clear in the following discussion of the operation of the invention, the revolution counter can be calibrated so as to give a direct reading of the torque applied to the rotating shaft 10 in relation to the position of transducer 20' on the lead screw 22. Shaft 10 is electrically grounded by means of a sliding contact 25.

The electrical signals representative of capacitances provided by the reference plates 21, 21' and the surfaces of hub 14 and shaft 10 are respectively applied to an inductance (not shown) built into each of the proximity transducers 20, 20' to form tuned radio frequency circuits. These circuits are link-coupled by means of low impedance cables 26 to a respective one of two oscillator-detector circuits 27, 27', each of which is grounded and in the described embodiment comprises a "Dynagage" oscillator-detector circuit, which is a radio frequency oscillator coupled to a diode detector circuit. This oscillator-detector is also manufactured by the Photocon Research Products Company. The small changes in capacity of the proximity transducers produce relatively large changes in the diode detector impedance. The outputs of the oscillator-detector circuits 27, 27' are therefore proportional to the distances between the surfaces of the hub 14 and shaft 10 (and their strips 18, 18') and the reference plates 21, 21' respectively. These outputs are fed by means of leads 28 to a signal display means 29, such as an oscilloscope, the signal from transducer 20 being inverted, for a reason that will appear hereinafter, by means of a phase inverter 30. The signal display means 29 is also grounded. Although the operation of the invention is simplified by the described arrangement in which strips 18, 18' are aligned as illustrated in FIG. 2 when the spindle 12 is not twisted, it will be recognized that if the strips were circumferentially displaced so that they would not simultaneously register with the reference plates 22, 22' prior to spindle twist, electronic delay circuitry could be utilized to provide synchronized signals from transducers 20, 20'.

Figures 2, 3, 4:
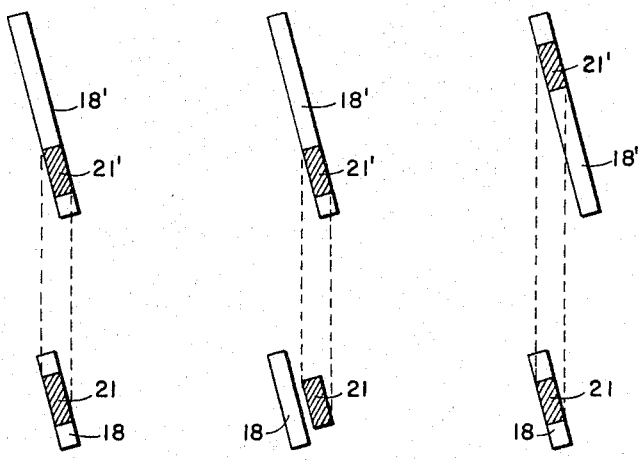
FIG. 2 is a diagrammatic representation of the geometric relation between the coacting capacitor plates of the embodiment of the invention illustrated in FIG. 1, when the shaft is not twisted.
FIG. 3 is a diagrammatic representation of the geometric relation between the coacting capacitor plates of the embodiment of the invention illustrated in FIG. 1, when the shaft is twisted but before the signals from the capacitor plates have been synchronized.
FIG. 4 is a diagrammatic representation of the geometric relation between the coacting capacitor plates of the embodiment of the invention illustrated in FIG. 1, when the shaft is twisted and the signals from the capacitor plates have been synchronized.

FIG. 2 represents the relative positions of the helical strips (in unwrapped or developed view) when the spindle 12 is not twisted. At this time strip 18 is circumferentially aligned (with respect to the common axis of the shaft 10 and hub 14) with the adjacent end of strip 18' and proximity transducer 20' is positioned as illustrated in FIG. 1. Under these conditions the signals generated in transducers 20, 20' are synchronized. The shaded areas represent the reference plates 21, 21' respectively in registry with the strips 18, 18'. It will be noted that strip 18 is positioned on the hub 14 so that it extends around the surface thereof at the same angle that strip 16 takes with respect to the shaft 10, that the strips 18, 18' have the same width, that the reference plates 22, 22' have the same length and width, and that the ends of the strips extend beyond the ends of the plates. Therefore, if the reference plates are equidistant from the outer surface of the strip with which they coact and the electrical pickup characteristics of the transducers 20, 20' are the same, the signals generated in the two capacitor sets 18, 20 and 18', 22' will be identical in amplitude and wave shape.

It should also be noted that if strip 18 were coextensive with the reference plate 21 (i.e., if strip 18 did not extend beyond the shaded area representing plate 21 in the figure) while the strip 18' extended beyond plate 21' as illustrated, the signal generated in the capacitor set 18, 21 would differ in wave form from that generated in the capacitor set 18', 21'. Although in the preferred embodiment of the invention herein described, the reference plates 21, 21' are of rectangular shape, which will provide a linear scope trace, the reference plates may also be of other shapes, as, for example, circular. However, if the reference plates are circular, the signals generated in the transducers 20, 20' will not vary linearly, and, consequently, the scope trace will not be so convenient to analyze as when rectangular plates are employed.

FIG. 3 is a diagrammatic representation of the geometric relation of strips 18, 18' after spindle 12 has undergone torsional twist in the direction opposite that of its rotation, as occurs, for example, when the shaft is driven to rotate models carried by arms 16. Reference plates 21, 21' remain in the same relative longitudinal or axial positions illustrated in FIGS. 1 and 2. However, in FIG. 3 strip 18 has been moved to the left in the drawing to represent its new position after spindle 12 has been twisted. The lower end of strip 18' will now register with reference plate 21' before strip 18 registers with reference plate 21, and the signal generated in the latter will lag the signal generated in the former. However, transducer 20' can be moved vertically on the lead screw 22 until plate 21′ registers with the portion of strip 18′ that is vertically aligned with strip 18 in its twisted position, and at this point the signals generated by the two capacitor sets will again be synchronized. This adjusted position of reference plate 21′ is illustrated in FIG. 4. It will be manifest that the distance which transducer 20′ must be moved to re-synchronize the signals is depent upon the amount of twist of the spindle 12, which is dependent on the torque applied, and that the revolution counter 24 can be calibrated in terms of applied torque versus the linear position of tranducer 20′ on the lead screw 22.

Figure 5:
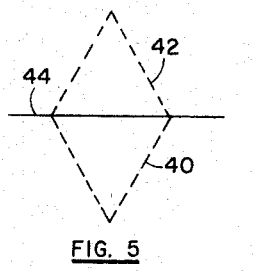

If the two proximity transducers 20, 20′ have equal detection strength and their reference plates 21, 21′ are equidistant from strips 18, 18′ when respectively in registry therewith, a straight line oscilloscope trace can be obtained of the combined signals from the transducers, as diagrammatically illustrated in FIG. 5 in which phantom line 40 represents the signals from transducer 20, phantom line 42 represents the signal from transducer 20′, and the solid line 44 represents the oscilloscope trace of the combination of the two signals. (In FIGS. 6, 7 and 8 corresponding reference characters are employed to identify the transducer signals and the oscilloscope trace of their combination.) If the conditions are as described except that the signals are not synchronized, the scope trace will appear as represented by line 44a in FIG. 6. Obviously an unsynchronized condition can be readily observed and transducer 20′ moved by drive means 23 to re-synchronize the signals after torque has been applied and spindle 12 twisted. As previously stated, the distance that transducer 20′ must be moved to re-synchronize the signals provides a measurement of twisting of the spindle or torque applied to shaft 10. Use of a fine thread on screw 22 and the revolution counter 24 will provide a highly precise indication of screw motion and thus of the amount of spindle twist.

Figures 6, 7:
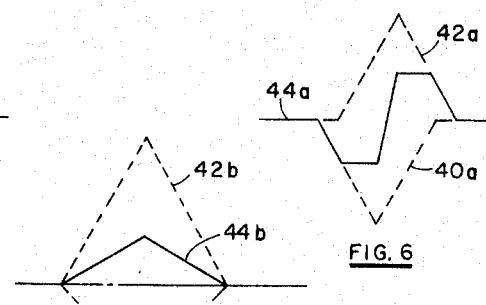
Figure 8:
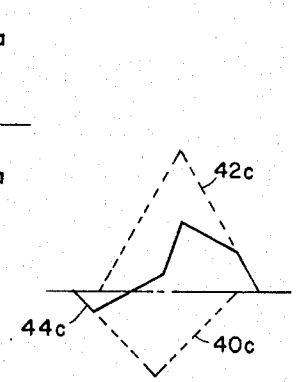

If the two proximity transducers 20, 20′ have unequal detection strength or their reference plates 22, 22′ are not equidistant from strips 18, 18′ when respectively in registry therewith, the oscilloscope trace of the combined signals from the transducers will appear as represented by line 44b in FIG. 7 when the signals are synchronized and as represented by line 44c in FIG. 8 when the signals are unsynchronized. It will be apparent that an adjustment of the position of transducer 20′ to synchronize the signals after the spindle 12 has been twisted can readily be accomplished when the signals generated in the capacitor sets have either the same or different amplitudes.

FIG. 9 illustrates a second embodiment of the invention which is similar to the first embodiment illustrated in FIG. 1, this second embodiment comprising a rotatable drive shaft 110 integral with a spindle 112, a hub 114 integral with the spindle and having a plurality of arms 116 extending radially therefrom, a metallic strip 117 mounted on the shaft 110 and extending helically about the surface thereof, and a groove 118 of rectangular cross-section helically formed in the hub 114. The groove 118 is circumferentially aligned (with respect to the common axis of shaft 110 and hub 114) with the lower end portion of strip 117, and the shaft 110 is grounded by means of a sliding contact 119. As in the case of the first described embodiment, capacitive type proximity transducers 120, 120′ are disposed adjacent the hub 114 and shaft 110 so that their rectangular reference plates 121, 121′ register with the strip 117 and groove 118 respectively as the shaft rotates, transducer 120 being mounted on a lead screw 122 that is connected to a drive means 123 and revolution counter 124. The transducers 120, 120′ may each be the "Model PT3–1" Proximity Transducer manufactured by the Photocon Research Products Company, which has been discussed above. Low impedance cables 126 interconnect the transducer circuits with respective oscillator-detector circuits 127, 127′, each of which is grounded. These oscillator-detector circuits may each comprise the "Dynagage" oscillator-detector circuit manufactured by the above-mentioned company and previously described in the discussion of the first embodiment. Outputs of the oscillator-detector circuits 127, 127′ are fed by means of leads 128 to a signal display means 129, such as an oscilloscope.

The mode of operation of the second embodiment of the invention is basically the same as that of the first described embodiment. However, when the groove 118 moves into registry with the reference plate 121 of transducer 120 the capacitance between this plate and the hub 114 will decrease. As the capacitance between strip 117 and reference plate 121′ of transducer 120′ is simultaneously increasing, the signals generated in the transducers 120, 120′ will be inverted with respect to each other and hence there is no need for a phase inverter as in the case of the first embodiment of the invention. In this embodiment groove 118 and plate 121 may be considered the coacting plates of one of the two capacitors of the system.

FIG. 10 is a representation of two oscilloscope traces obtainable when the embodiment of the invention illustrated in FIG. 1 is employed as a means of detecting rotational imbalance of the spindle 12 and hub 14 of that embodiment. It is to be understood that the method of detecting rotational imbalance described hereinafter can also be used to detect imbalance of the shaft 10, although for present purposes it will be assumed that shaft 10 is so constructed and supported that its rotation is not affected by imbalance of the spindle 12 and hub 14. Under the assumed condition of operation the transducer 20′ is disconnected from the oscilloscope 26. In FIG. 10 the spikes 48, 52 represent for two different hub 14 rotational conditions the pulse signals generated in transducer 20 as strip 18 moves into and out of registry with reference plate 21 each time the shaft 10 rotates. For convenience, the pulse signals from transducer 20 are shown in inverted relation to the representation thereof in FIGS. 5, 6, 7 and 8. The eight divisions between the spikes 48 each represent 45° segments on the periphery of the hub 14. If spindle 12 and hub 14 are not rotating in a balanced condition, as a result, for example, of improper loading of the arms 16, the surface of the hub will move toward and away from reference plate 21 as the spindle rotates, thereby changing the capacitance between the hub and the reference plate and generating a signal in transducer 20 which is represented in FIG. 10 by a sinusoidal curve 50. If the imbalance of the assembly is such that the surface of the hub nearest the reference plate when strip 18 is 180° removed from its point of full registry with the reference plate, the oscilloscope trace will appear as represented by curve 50. The phantom lines 52, 54 of the figure represents an imbalance condition wherein the surface of the hub is nearest the reference plate when strip 18 is 90° removed from registry with the plate. In any condition of imbalance the scope trace reveals the point on the surface of hub 14 which most closely approaches reference plate 20 as shaft 10 rotates and necessary steps can be taken to return the hub to a balanced condition. It will be understood that the spikes appearing in the oscilloscope trace also provide a means for obtaining the rotational speed of the shaft 10, the number of such spikes in a given time interval being proportional to such speed.

Although the invention has been described and illustrated in detail, it is to be clearly understood that the same is by way of illustration and example only and is not to be taken by way of limitation, the scope of the invention being limited only by the language of the appended claims. Persons skilled in the art will recognize that other detecting means may be substituted for the capacitance type detecting system herein described, such as photoelectric or magnetic detecting systems, and that such systems can operate within the concept of the invention. Likewise electronic comparator means other than an oscilloscope may be employed for comparing the signals generated in the particular detecting system that is selected. Furthermore, while the invention has been described with respect to detection of twist of a rotating shaft, it is to be understood that the principles of the invention apply equally well to the determination of twist of a stationary shaft.

What is claimed is:

1. Apparatus for detecting torques experienced by a shaft rotating relative to a support comprising in combination with a shaft and its support:

first and second transducers mounted at axially spaced portions of the shaft, said first transducer comprising a first elongated capactive element on a first shaft portion extending helically about the shaft axis, and a second elongated capacitive element having a longitudinal extent less than that of the first capacitive element and fixed to the support in proximity to the first element and extending helically about the shaft axis in alignment with the first capacitive element, the second transducer comprising a third elongated capacitive element fixed to the shaft at a second shaft portion and extending helically about the shaft axis for a distance considerably greater than the extent of the first capacitive element of the first transducer, a lead screw movably mounted on the support of the shaft, a fourth elongated capacitive element carried by the lead screw in proximity with the third capacitive element, said fourth capacitive element having a length substantially equal to the length of the second capacitive element of the first transducer, and extending helically about the shaft axis in alignment with the third capacitive element, all of said capacitive elements being of substantially equal width, means carried by the support for rotatably driving the lead screw to effect displacement of the fourth capacitive element in a direction along the axis of the shaft, an oscillator connected in circuit with each coacting pair of the capacitive elements to electrically excite the transducers, and a display device electrically connected with the electrical outputs of both transducers for displaying the combined outputs of the transducers.

2. Apparatus for detecting torque experienced by a shaft rotating relative to a support comprising:

a first transducer having first and second sensing elements elongated in like oblique directions relative to the axis of rotation of the shaft, said first element being substantially longer than said second element, one of said elements being fixed to the shaft, means mounting the other element to the support for movement along the axis of rotation of the shaft, reference transducer means spaced from said first transducer and including third and fourth sensing elements elongated in said like oblique directions, said third element being longer than the fourth element and substantially shorter than the first element, one of said third and fourth elements being mounted on the shaft and the other being mounted on the support, means for exciting the transducers to provide electrical signals modulated as the shaft rotates, means for presenting the signals for comparison, means for moving said other element of the first transducer to effect a predetermined relation between signals from said transducers, and output means responsive to said moving means.

3. Apparatus for detecting torsional displacement of a shaft mounted in a support comprising:

a first transducer having a first element secured to the shaft and second element secured to the support, one of said elements being elongated and extending in an oblique direction relative to the axis of the shaft and relative to a normal to said axis, means for displacing the second element of the transducer in a direction intersecting said oblique direction, means for indicating the displacement of said second element, a second transducer for sensing shaft position spaced along the shaft from the first transducer, and means for combining outputs of both said transducers.

4. Apparatus for detecting torque experienced by a shaft rotating relative to a support comprising:

a transducer having first and second sensing elements elongated in like oblique directions relative to the axis of rotation of the shaft, said first element being substantially longer than said second element, one of said elements being fixed to the shaft, means mounting the other element to the support for movement along the axis of rotation of the shaft, reference transducer means including an element on the shaft spaced from said one element, and output means responsive to both said transducers.

5. Apparatus for detecting torque applied to a shaft comprising:

a first helical metallic strip disposed on the surface of the shaft, a capacitive plate disposed adjacent the shaft so as to register with said first strip, a second helical metallic strip disposed on the surface of the shaft at a point axially spaced from said first strip, a capacitive plate disposed adjacent the shaft and movable parallel to the axis thereof so as to be capable of registering with selected portions of said second strip, and means for comparing the capacitance between each of said capacitive plates and the adjacent shaft and strips.

6. Apparatus for detecting torque applied to a shaft comprising:

a first helical metallic strip disposed on the surface of the shaft, a capacitive plate disposed adjacent the shaft so as to register with said first strip, a second helical metallic strip disposed on the surface of the shaft at a point axially spaced from said first strip, said second strip being longer than said first strip, a capacitive plate disposed adjacent the shaft and movable parallel to the axis thereof so as to be capable of registering with selected portions of said second strip, and means for comparing the capacitance between each of said capacitive plates and the adjacent shaft and strips.

7. Apparatus for detecting torque applied to a shaft comprising:

a helical groove formed on the surface of the shaft, a capacitive plate disposed adjacent the shaft so as to register with said groove, a helical metallic strip disposed on the surface of the shaft at a point axially spaced from said groove, a capacitive plate disposed adjacent the shaft and movable parallel to the axis thereof so as to be capable of registering with selected portions of said strip, and means for comparing the capacitance between each of said capacitive plates and the adjacent shaft and strip.

8. Apparatus for detecting torque applied to a shaft comprising:

a helical groove formed on the surface of the shaft, a capacitive plate disposed adjacent the shaft so as to register with said groove, a helical metallic strip disposed on the surface of the shaft at a point axially spaced from said groove, said strip having a length greater than the length of said groove, a capacitive plate disposed adjacent the shaft and movable parallel to the axis thereof so as to be capable of registering with selected portions of said strip, and means for comparing the capacitance between each of said capacitive plates and the adjacent shaft and strip.

9. Apparatus for detecting displacement of a first part relative to a second part comprising:

a transducer having first and second sensing elements elongated in like oblique directions relative to a reference direction, said first element being substantially longer than said second element, one of said elements being fixed to the first part;

means mounting the other element to the second part for movement along the reference direction;

reference transducer means including an element on the first part spaced from said one element; and output means responsive to both said transducers.

References Cited by the Examiner
UNITED STATES PATENTS

| | | | |
|---|---|---|---|
| 2,675,700 | 4/1954 | Van Degrift et al. | 73—136 |
| 2,811,853 | 11/1957 | Friedman | 73—136 |
| 2,947,168 | 8/1960 | Yang | 73—136 |
| 2,983,141 | 5/1961 | Vanator | 73—162 |
| 3,163,037 | 12/1964 | Kawabata | 73—136 |
| 3,173,058 | 3/1965 | Richards | 324—70 X |
| 3,190,125 | 6/1965 | Holz | 73—432 |

RICHARD C. QUEISSER, *Primary Examiner.*

C. A. RUEHL, *Assistant Examiner.*